United States Patent
Ge

(10) Patent No.: US 7,143,580 B2
(45) Date of Patent: Dec. 5, 2006

(54) VIRTUAL COMPRESSOR OUTLET TEMPERATURE SENSING FOR CHARGE AIR COOLER OVERHEATING PROTECTION

(75) Inventor: Ping Ge, Troy, MI (US)

(73) Assignee: Detroit Diesel Corporation, Detroit, MI (US)

( * ) Notice: Subject to any disclaimer, the term of this patent is extended or adjusted under 35 U.S.C. 154(b) by 122 days.

(21) Appl. No.: 10/971,469

(22) Filed: Oct. 22, 2004

(65) Prior Publication Data

US 2006/0086089 A1 Apr. 27, 2006

(51) Int. Cl.
 F02B 33/44 (2006.01)
 F02B 33/00 (2006.01)
 F02M 25/07 (2006.01)
(52) U.S. Cl. .............. 60/605.1; 60/605.2; 123/563; 123/568.22
(58) Field of Classification Search .......... 60/605.1, 60/605.2, 611; 123/568.22, 563; 701/104–112
See application file for complete search history.

(56) References Cited

U.S. PATENT DOCUMENTS

| 6,347,519 | B1 * | 2/2002 | Kreso ..................... 60/605.2 |
| 6,401,457 | B1 * | 6/2002 | Wang et al. ............. 60/605.22 |
| 6,529,815 | B1 * | 3/2003 | Hawkins et al. ............ 123/563 |
| 6,681,171 | B1 * | 1/2004 | Rimnac et al. ......... 123/568.22 |
| 6,698,203 | B1 * | 3/2004 | Wang ......................... 60/611 |

\* cited by examiner

Primary Examiner—Thai-Ba Trieu
(74) Attorney, Agent, or Firm—Brooks Kushman P.C.

(57) ABSTRACT

A system and method for controlling an internal combustion engine, having an exhaust recirculation (EGR) system and a charge air cooler, to prevent overheating the charge air cooler. The system calculates the output temperature of a turbocharger compressor as a function of ambient air temperature, air pressure, air mass flow rate, and turbo speed by processing an equation and controls the engine to modify charge air flow to reduce the output temperature of the turbocharger compressor if that temperature exceeds that of a determined crucial temperature above which charge air cooler damage could occur.

18 Claims, 3 Drawing Sheets

VIRTUAL COMPRESSOR OUTLET TEMPERATURE SENSING FOR CHARGE AIR COOLER OVERHEATING PROTECTION

BACKGROUND OF THE INVENTION

1. Field of the Invention

The present invention relates generally to systems and methods for controlling turbocharger compressor output temperature in a compression-ignition engine and, in particular, to a system and method for determining the temperature of charge air exiting the turbocharger compressor.

2. Background Art

In a typical compression-ignition engine equipped with an exhaust gas recirculation (EGR) system, a limited amount of exhaust gas is directed into an intake manifold of the engine. This ensures that unused fuel and byproducts are combusted before they are released to the atmosphere, and it also lowers peak combustion temperature to minimize the formation of oxides of nitrogen (NOx). This feature is enhanced by the addition of an EGR cooling system, which reduces the EGR gas temperature before it is introduced into the intake manifold. This increases EGR charge density and reduces overall combustion temperatures and their contribution to the formation of NOx.

In engines so equipped, intake air is commonly compressed and cooled, typically by respectively using a turbocharger compressor and a charge air cooler, to increase power density, that is, the power per swept volume. Added flexibility in the compression of intake air compared with that of a conventional turbocharger compressor is often achieved by using a variable geometry turbocharger (VGT). The flexibility optimizes the turbocharger rotational speed and acceleration, which minimizes turbo lag, the response time required for the turbocharger to begin to affect engine performance following an accelerator actuation. The VGT is typically controlled by an electronic control module (ECM) to supply to the engine amounts of turbo boost that vary depending on various operating conditions.

A concern with compressing intake air is that of overheating the charge air cooler. Accordingly, a dependable and accurate method of determining the output temperature of the compressor is an important factor in preventing such overheating.

SUMMARY OF THE INVENTION

The present invention provides a system and method for controlling a compression ignition engine to avoid overheating a charge air cooler. A representative system and method monitor current ambient and engine operating conditions to determine if conditions are favorable for overheating the charge air cooler. If such conditions are detected, the engine is controlled accordingly to avoid overheating. Preferably, the engine is controlled to limit the temperature of the turbocharger compressor output. The present system and method uses a virtual sensor to determine the compressor output temperature, the virtual sensor being defined as a predictive model of an engine used by a microprocessor, in parallel with the real engine, in real time, and using the same real values of sensed ambient and engine operating conditions as does the real engine.

In the present invention, the method for monitoring current ambient conditions includes determining ambient air temperature and ambient pressure. The method for monitoring engine operating conditions includes determining air mass flow rate and turbocharger compressor speed. The method for controlling the engine includes using the monitored ambient and engine condition results to calculate turbocharger compressor output temperature.

A preferred method for calculating turbocharger compressor output temperature (TCO) is to use a virtual TCO sensor based on the following equation, which may be incorporated into an electronic control unit (ECU).

$$TCO = \frac{ATS \times CF}{\eta_{TT}} \left( P_r^{\frac{\gamma-1}{\gamma}} - 1 + \eta_{TT} \right)$$

where: ATS is the temperature of the turbocharger compressor inlet;

$\eta_{TT}$ is the compressor efficiency;

$P_r$ is the compressor pressure ratio;

$\gamma$ is the ratio of specific heats; and

CF is the TCO sensor correction factor.

The TCO value is compared with a crucial temperature above which damage to the charge air cooler could occur. If the TCO value is greater than the crucial temperature, the engine is controlled to reduce the turbocharger compressor output temperature to avoid such damage. Preferably, controlling the engine includes at least modifying EGR flow and/or includes at least modifying charge air flow by directing a portion of it to bypass the charge air cooler.

DETAILED DESCRIPTION OF THE PREFERRED EMBODIMENT

Figure 1:
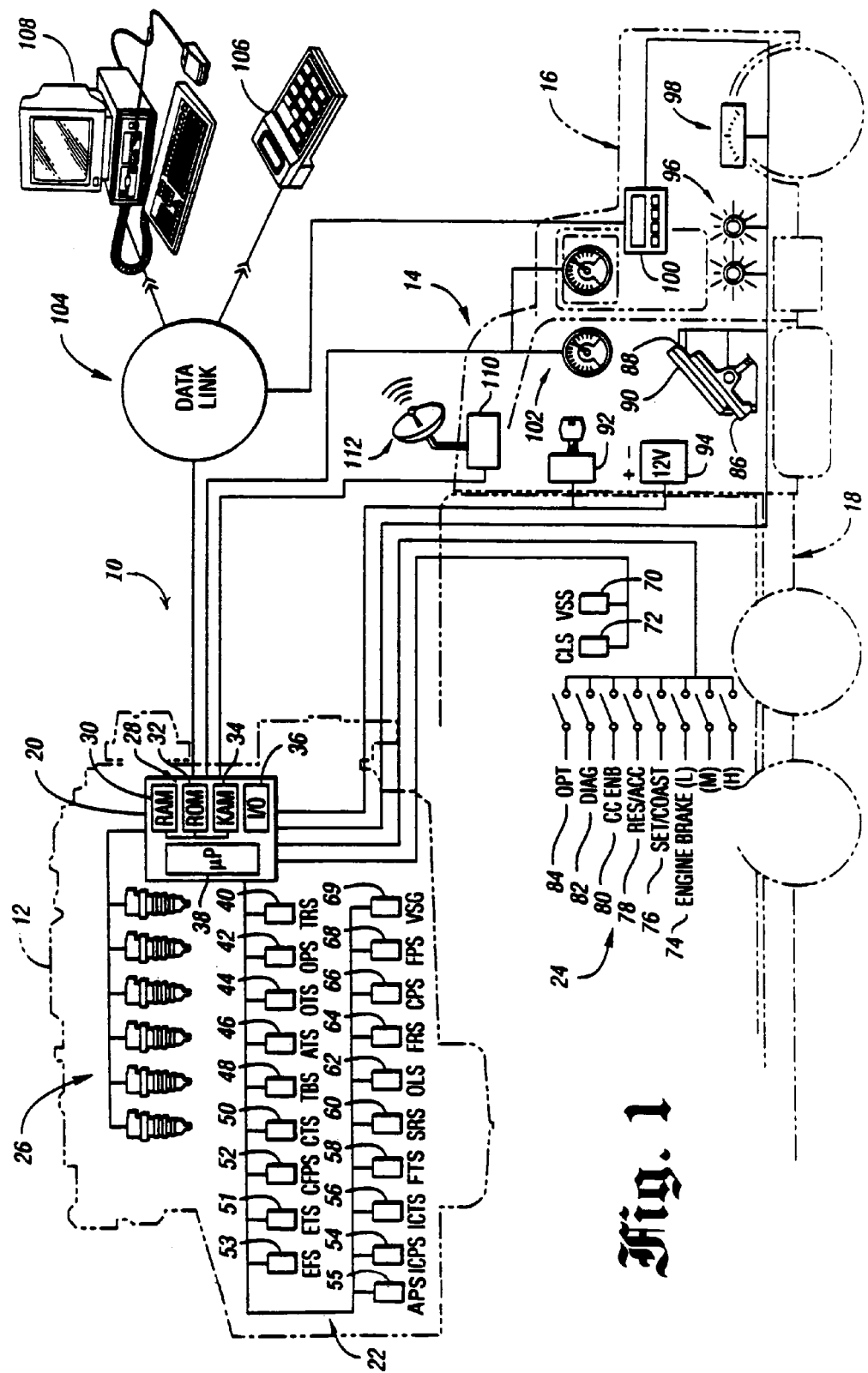
FIG. 1 is a block diagram illustrating a representative system or method for controlling a compression-ignition, internal combustion engine to avoid overheating a charge air cooler according to the present invention.

FIG. 1 provides a schematic/block diagram illustrating operation of a system or method for controlling a compression ignition engine to avoid overheating a charge air cooler according to the present invention. The system 10 includes a multicylinder, compression ignition, internal combustion engine, such as a diesel engine 12, which may be installed in a vehicle, generally indicated by reference numeral 14, depending on the particular application. The vehicle 14 includes a tractor, generally indicated by reference numeral 16, and a semitrailer, generally indicated by reference numeral 18. The diesel engine 12 is installed in the tractor 16 and interfaces with various sensors and actuators located on the engine 12, tractor 16, and semitrailer 18 via engine and vehicle wiring harnesses as described in the following in greater detail. In other applications, the engine 12 may be used to operate industrial and construction equipment or in stationary applications for driving generators, compressors, and/or pumps and the like.

An electronic engine control module (ECM) 20 receives signals generated by engine sensors/switches, generally indicated by reference numeral 22, and vehicle sensors, generally indicated by reference numeral 24, and processes the signals to control engine and/or vehicle actuators such as fuel injectors, generally indicated by reference numeral 26. The ECM 20 preferably includes computer-readable storage media, generally indicated by reference numeral 28, for storing data representing instructions executable by a computer 108 to control the engine 12. Computer-readable storage media 28 may also include calibration information in addition to working variables, parameters, and the like. The computer-readable storage media 28 include a random access memory (RAM) 30 in addition to various nonvolatile memory such as read-only memory (ROM) 32, and keep-alive, or nonvolatile, memory (KAM) 34. The computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data that include solid state, magnetic, optical, and combination devices. For example, the computer-readable storage media 28 may be implemented using one or more physical devices such as DRAM, PROMS, EPROMS, EEPROMS, flash memory, and the like. Depending on the particular application, computer-readable storage media 28 may also include floppy disks, CD ROM, and the like.

In a typical application, the ECM 20 processes inputs from the engine sensors 22 and the vehicle sensors/switches 24 by executing instructions stored in the computer-readable storage media 28 to generate appropriate output signals for control of the engine 12. The engine sensors 22 include a timing reference sensor (TRS) 40, which provides an indication of crankshaft position and may be used to determine engine speed. An oil pressure sensor (OPS) 42 and an oil temperature sensor (OTS) 44 are used to monitor the pressure and temperature of engine oil respectively.

An air temperature sensor (ATS) 46 is used to provide an indication of the current intake, or ambient, air temperature. A turbo boost sensor (TBS) 48 is used to provide an indication of the boost pressure of a turbocharger compressor 170 FIG. 2), which is preferably a variable geometry or variable nozzle turbocharger as described in greater detail in the following. As known by those of ordinary skill in the art, the TBS 48 may also be used to provide an indication of intake manifold pressure. A coolant temperature sensor (CTS) 50 is used to provide an indication of coolant temperature. Depending on the particular engine configuration and application, various additional sensors may be included. For example, engines that utilize exhaust gas recirculation (EGR) according to the present invention preferably include an EGR temperature sensor (ETS) 51, an ambient pressure sensor (APS) 55, and an EGR flow sensor (EFS) 53. The EFS 53 is preferably a sensor that detects a differential temperature between two heated elements to determine the mass flow rate of EGR gas through an EGR circuit. The heated elements preferably provide pyrolitic cleaning by being heated to a temperature to reduce or prevent soot accumulation. Alternatively, a ΔP sensor may be used to determine the EGR flow rate as described in U.S. application Ser. No. 09/641,256 filed Aug. 16, 2000 and assigned to the assignee of the present invention, the disclosure of which is hereby incorporated by reference in its entirety.

Applications utilizing a common rail fuel system may include a corresponding fuel pressure sensor (CFPS) 52. Similarly, an intercooler coolant pressure sensor (ICPS) 54 and a temperature sensor (ICTS) 56 may be provided to sense the pressure and temperature of intercooler coolant. The engine 12 also preferably includes a fuel temperature sensor (FTS) 58 and a synchronous reference sensor (SRS) 60. The SRS 60 provides an indication of a specific cylinder in the firing order of the engine 12. This sensor may be used to coordinate or synchronize control of a multiple-engine configuration such as used in some stationary generator applications. An EGR cooler 150 (FIG. 2) and a corresponding temperature sensor may also be provided to cool EGR gas prior to introduction to an engine intake.

The engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure, which may be used for various engine protection features by detecting a sudden increase in crankcase pressure indicative of an engine malfunction. Also, a variable speed governor sensor (VSG) 69 provides an indication of the disposition of a variable speed governor.

The system 10 preferably includes various vehicle sensors, some of which may be virtual sensors, and switches 24 to monitor vehicle operating parameters and driver input used in controlling the vehicle 14 and the engine 12. For example, the vehicle sensors/switches 24 may include a vehicle speed sensor (VSS) 70, which provides an indication of the current vehicle speed. A coolant level sensor (CLS) 72 monitors the level of engine coolant in a vehicle radiator. Switches used to select an engine operating mode or otherwise control operation of the engine 12 or the vehicle 14 may include an engine braking selection switch 74, which preferably provides low, medium, high, and off selections, cruise control switches 76, 78, and 80, a diagnostic switch 82, and various optional, digital and/or analog switches 84. The ECM 20 also receives signals associated with an accelerator or foot pedal 86, a clutch pedal 88, and a brake pedal 90. The ECM 20 may also monitor position of a key switch 92 and system voltage provided by a vehicle battery 94.

The ECM 20 may communicate with various vehicle output devices such as status indicators/lights 96, analog displays 98, digital displays 100, and various analog/digital gauges 102. The ECM 20 utilizes an industry standard data link 104 to broadcast various status and/or control messages which may include engine speed, accelerator pedal position, vehicle speed, and the like. Preferably, the data link 104 conforms to SAE J1939 and SAE J1587 to provide various service, diagnostic, and control information to other engine systems, subsystems, and connected devices such as a display 100. Preferably, the ECM 20 includes control logic to determine current ambient and engine operating conditions, to detect conditions favorable to overheating a charge air cooler 174 (FIG. 2) and to control the engine accordingly to avoid this condition. As described in greater detail in the following, the ECM 20 preferably monitors ambient temperature, ambient pressure, air mass flow rate, and turbocharger compressor speed to determine the temperature at the turbocharger compressor output to facilitate the activation of strategies for preventing overheating of the charge air cooler 174. The strategies include selectively reducing EGR flow and bypassing at least a portion of charge air around the charge air cooler 174.

A service tool 106 may be periodically connected via data link 104 to program selected parameters stored in The ECM 20 and/or receive diagnostic information from the ECM 20. Likewise, a computer 108 may be connected with the appropriate software and hardware via data link 104 to transfer information to the ECM 20 and receive various information relative to operation of engine 12, and/or vehicle 14. A receiver 110 and antenna 112 may also be included to receive electromagnetic signals from remote locations and communicate them to the ECM 20.

Figure 2:
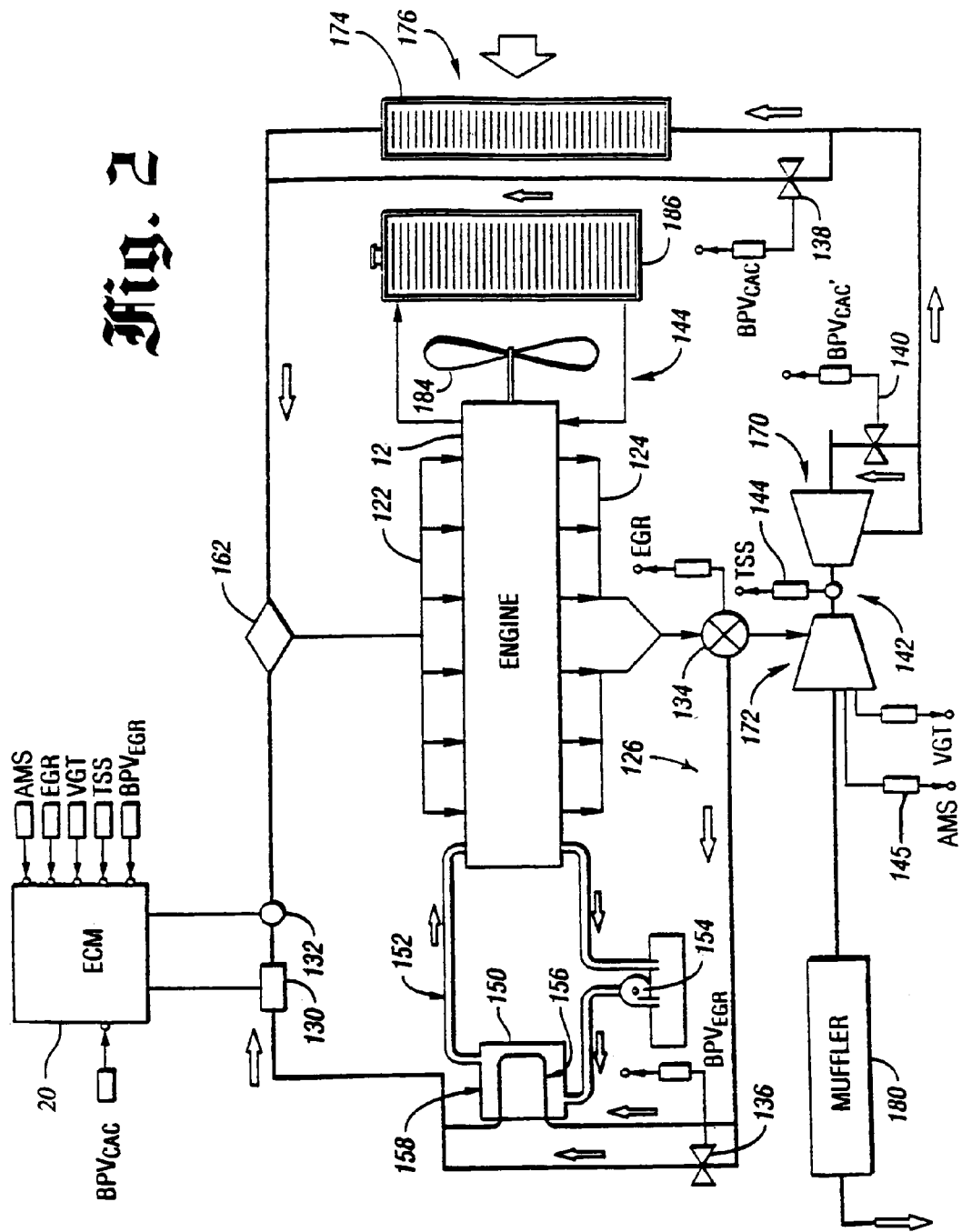
FIG. 2 is a block diagram illustrating a representative charge air cooler for a compression-ignition engine having a charge air cooler bypass and a turbocharger compressor according to the present invention.

FIG. 2 is a block diagram illustrating a representative EGR system in communication with the ECM 20 having control logic to control operation of an EGR circuit 126 to prevent overheating the turbocharger compressor 170 according to the present invention. The engine 12 includes an intake manifold 122, an exhaust manifold 124, and an exhaust gas recirculation (EGR) system, generally indicated by reference numeral 126. The engine control module (ECM) 20 includes stored data representing instructions and calibration information for controlling the engine 12. The ECM 20 communicates with various sensors and actuators including EGR sensors such as the EGR flow sensor 130 and the EGR temperature sensor 132. The ECM 20 controls the EGR system 126 via actuators such as an EGR control valve 134, and an EGR cooler bypass valve ($BPV_{EGR}$) 136, and optionally one or more charge air cooler bypass valves ($BPV_{CAC}$) 138 and 140. In addition, the ECM 20 preferably controls a variable nozzle or variable geometry turbocharger (VGT) 142 and monitors an associated turbo speed sensor (TSS) 144, an air mass flow rate sensor (AMS) 145, an ambient air temperature sensor (ATS) 46 (FIG. 1), and an ambient barometric pressure sensor (APS) 55 (also FIG. 1).

The EGR system 126 preferably includes an EGR cooler 150 that is connected to an engine coolant circuit indicated generally by reference numeral 152. The EGR cooler 150 is preferably a full-flow cooler connected in line with the engine coolant system, i.e., the EGR cooler 150 receives the entire coolant flow for the engine 12, although other arrangements and types of EGR coolers may be used without departing from the scope of the present invention. The EGR cooler 150 may be directly coupled to a corresponding water or coolant pump 154, or may be placed at a different location in the engine cooling circuit depending on the particular application. In addition, the EGR cooler 150 is preferably a two-pass cooler providing a first pass, as generally indicated by reference numeral 156, and a second pass, as generally indicated by reference numeral 158, of the EGR gas through a cooler core.

The EGR cooler bypass valve ($BPV_{EGR}$) 136 may be selectively operated by the ECM 20 to control temperature of the EGR flow by diverting none or some of the flow around the EGR cooler 150 based on current ambient and engine operating conditions as illustrated and described with reference to FIG. 3. The valve 136 may be a solenoid-operated, on/off valve so that none or some of the EGR flow bypasses the EGR cooler 150. Although a modulating bypass valve may be useful for some applications, it is not required because modulation of the EGR control valve 134 may be used to control the overall EGR flow. Similarly, one or more charge air bypass valves ($BPV_{CAC}$) 138 and 140 may be provided to adjust selectively the temperature of air leaving the turbocharger compressor 170 and passing through the charge air cooler 174. As illustrated, charge air bypass valve 138 selectively diverts none or some of the charge air around the charge air cooler 174 to control the temperature of the latter. Preferably, the ECM 20 operates valves 136, and/or 138 and/or 140 to control EGR temperature based on current ambient and engine operating conditions to avoid overheating the charge air cooler 174. As described in the following, the control strategy may use turbo speed, air mass flow rate, ambient air temperature, and ambient barometric temperature to determine when to control the EGR control valve 134 and one or more bypass valves 136, 138, and 140 to prevent an overheating condition.

In operation, the ECM 20 controls the EGR system 126 and the VGT 142 based on current ambient and engine operating conditions and calibration information to mix EGR gas with charge air via mixer 162 which is preferably a pipe union tee. The combined charge air and EGR gas is then suppled to the engine 12 through the intake manifold 122. The representative engine 12 shown is a 6-cylinder compression-ignition internal combustion engine. The ECM 20 includes control logic to monitor current ambient operating conditions, such as temperature and optionally humidity, and engine control parameters and operating conditions to control the EGR system 126. During operation of the engine 12, intake air passes through the compressor portion 170 of the VGT 142, which is powered by a turbine portion 172 via hot exhaust gas. Air compressed by the compressor 170 then travels through the charge air cooler 174, which is preferably an air-to-air cooler cooled by ram air 176. The charge air then flows through the mixer 162, where it is combined with EGR gas. EGR gas exiting the engine 12 through the exhaust manifold 124 passes through the EGR control valve 134 where a portion of the exhaust gas may be selectively diverted through the EGR cooler 150. The bypass valve 136 is selectively operated to divert a portion (none or some) of the diverted exhaust gas around the cooler 150 to adjust the temperature of the EGR gas. The EGR gas flow past the EGR flow sensor 130 and the temperature sensor 132 to the mixer 162, where they are combined with compressed charge air. Remaining exhaust gas not diverted by the EGR control valve 134 pass through the turbine portion 172 of the VGT 142 and a muffler 180 before being exhausted to atmosphere. The EGR cooler 150 cools the heated EGR gas using engine coolant flowing through the engine coolant circuit 152. Engine coolant is cooled by a cooling fan 184 and a radiator 186.

As described in the foregoing, one or more bypass valves may be added to the intake side of the engine 12 upstream of the charge air cooler (CAC) 174 to divert selectively none or some of the charge air from the compressor portion 170 of the VGT 142. The charge air cooler (CAC) bypass valve(s) are selectively operated similar to the EGR bypass valve 136 under specific ambient and engine operating conditions that may promote overheating of the charge air cooler 174 as described and illustrated with respect to FIG. 3. The strategy that prevents such overheating is based on a virtually sensed turbocharger compressor output temperature (TCO) determined as a function of signals received from the turbo speed sensor (TSS) 144, the air mass flow rate sensor (AMS) 145, the air temperature sensor (ATS) 46 (FIG. 1), and the ambient pressure sensor (APS) 55 (also FIG. 1).

Figure 3:
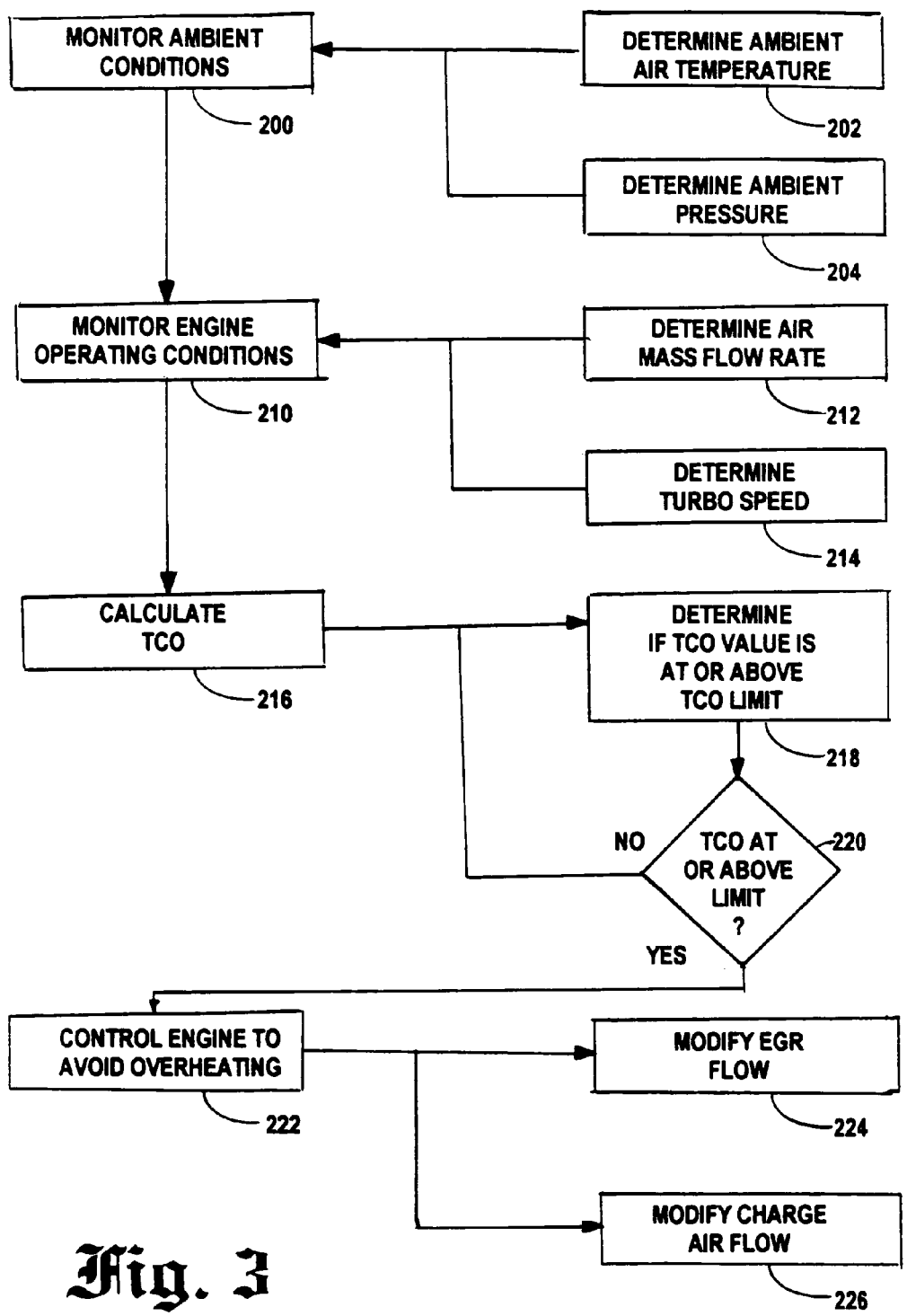
FIG. 3 is a block diagram illustrating operation of a system or method for controlling a compression-ignition, internal combustion engine to avoid overheating a charge air cooler according to the present invention.

FIG. 3 is a block diagram illustrating operation of an embodiment for a system or method for controlling an engine to avoid overheating the charge air cooler 174 (FIG. 2) according to the present invention. As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in a DDEC controller manufactured by Detroit Diesel Corporation, Detroit, Mich. Of course, control of the engine/vehicle may include one or more functions implemented by dedicated electric, electronic, or integrated circuits.

As will also be appreciated by those of skill in the art, the control logic may be implemented using any of a number of known programming and processing techniques or strategies and is not limited to the order or sequence illustrated in FIG. 3. For example, interrupt or event driven processing is typically employed in real-time control applications, such as control of an engine or vehicle, rather than a purely sequential strategy as illustrated. Likewise, parallel processing, multitasking, or multithreaded systems and methods may be used to accomplish the objectives, features, and advantages of the present invention.

The invention is independent of any particular programming language, operating system, processor, or circuitry used to develop and/or implement the control logic illustrated. Likewise, depending on the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

The control logic illustrated is implemented primarily in software and is stored in computer-readable storage media within the ECM 20 (FIG. 2). As one of ordinary skill in the art will appreciate, various control parameters, instructions, and calibration information stored within the ECM 20 may be selectively modified by the vehicle owner/operator while other information is restricted to authorized service or factory personnel. The computer-readable storage media may also be used to store engine/vehicle operating information for vehicle owners/operators and diagnostic information for maintenance/service personnel. Although not explicitly illustrated, various steps or functions may be repeatedly performed depending on the type of processing employed.

In the representative embodiment of the present invention illustrated in FIG. 3, current ambient conditions are determined or monitored as represented by a block 200. Ambient conditions may be determined using appropriate sensors or estimated or inferred depending on the particular application. Preferably, the block 200 represents at least a determination of ambient air temperature, as represented by a block 202, and ambient air pressure, as represented by a block 204.

Current engine operating conditions are monitored or determined as represented by a block 210. Engine operating conditions may be determined using appropriate sensors or estimated or inferred depending on the particular application. Preferably, the block 210 represents at least a determination of the rate of air mass flow, as represented by a block 212, and of turbocharger compressor speed, as represented by a block 214. The determination of current ambient and engine operating conditions represented by the blocks 200 and 210, respectively, are then used to calculate the temperature (TCO) of the turbocharger compressor output, as represented by a block 216.

A preferred method for calculating turbocharger compressor output temperature (TCO) is to use a virtual TCO sensor based on the following equation, which may be incorporated into the ECM 20.

$$TCO = \frac{ATS \times CF}{\eta_{TT}} \left( P_r^{\frac{\gamma-1}{\gamma}} - 1 + \eta_{TT} \right)$$

where: ATS—temperature of the turbocharger compressor inlet;
$\eta_{TT}$—compressor efficiency (2D table calibration function of corrected mass flow and corrected turbo speed);
$P_r$—compressor pressure ratio (2D table calibration function of corrected mass flow and corrected turbo speed);
$\gamma$—ratio of specific heats (constant=1.4); and
CF—TCO sensor correction factor (scalar calibration).

As indicated by the foregoing, both the compressor efficiency and the turbocharger compressor pressure ratio are each a two-dimensional table calibration function of corrected turbo speed and air mass flow. A preferred method for calculating these latter two values is based on the following equations, which may be incorporated into the ECM 20.

$$\text{Corrected Turbo Speed} = \sqrt{\frac{T_{ref}}{ATS}} \times TSS$$

$$\text{Corrected Mass Flow} = \frac{P_{ref} \times \dot{M}_{turbo}}{\sqrt{\frac{T_{ref}}{ATS}} \times APS}$$

where: APS—ambient barometric pressure;
ATS—temperature of the turbocharger compressor inlet;
TSS—turbo speed;
$T_{ref}$—reference temperature at which mapped data was run;
$P_{ref}$—reference pressure at which mapped data was run; and
$\dot{M}_{turbo}$—air mass flow rate through the compressor.

The value of TCO is then compared, as represented by a block 218, with a crucial (calibratable and/or adaptable) temperature above which damage to the charge air cooler 174 (FIG. 2) could occur. If the value of TCO is determined, as represented by a block 220, to be equal to or greater than the crucial temperature, the engine 12 (FIGS. 1 and 2) is controlled, as represented by a block 222, to reduce the turbocharger compressor output temperature to avoid such damage. Preferably, controlling the engine 12 includes at least modifying EGR flow, as represented by a block 224 and/or includes at least modifying charge air flow, as represented by a block 226, by directing at least a portion of it to bypass the charge air cooler 174 (FIG. 2).

The virtual TCO sensor has a much faster response time than a real physical sensor. In view of this, a well-known, low-pass filter (not shown) having an adjustable response time is preferably added to the TCO sensor model so that the time response of the virtual sensor can be correlated to those of engine control signals.

As described by the foregoing, the present invention provides a system and method for avoiding overheating the charge air cooler 174. While the foregoing illustrate and describe the invention, it is not intended that all possible forms of the invention have been illustrated and described. Rather, the words used in the specification are words of description rather than limitation; and it is to be understood that various changes may be made without departing from the spirit and scope of the invention.

What is claimed is:

1. A method for controlling an internal combustion, compression-ignition engine, having an EGR circuit, a turbocharger compressor, and a charge air cooler, to avoid overheating the charge air cooler, the method comprising:
   determining a crucial temperature above which damage to the charge air cooler could occur;
   determining current ambient conditions;
   determining current engine operating conditions;
   processing an equation wherein a value of turbocharger compressor output temperature is predicted as a function of parameters representing the determined current ambient conditions and current engine operating conditions;
   comparing the predicted turbocharger compressor output temperature with the determined crucial temperature; and
   controlling the engine to prevent damage to the charge air cooler if the turbocharger compressor output temperature exceeds the determined crucial temperature.

2. The method as defined by claim 1, wherein the step of determining a crucial temperature comprises assigning a value from a memory or storage of data.

3. The method as defined by claim 1, wherein the step of determining current ambient conditions includes determining ambient air temperature and air pressure.

4. The method as defined by claim 1, wherein the step of determining current engine operating conditions includes determining air mass flow rate and turbocharger compressor speed.

5. The method as defined by claim 1, wherein the step of controlling the engine comprises reducing the temperature of the charge air cooler.

6. The method as defined by claim 5, wherein reducing the temperature of the charge air cooler comprises bypassing at least a portion of the charge air around the charge air cooler before said portion of the charge air around the charge air cooler is directed to an intake manifold of the engine.

7. The method as defined by claim 1, wherein the step of processing an equation comprises instructions for processing the following equation:

$$TCO = \frac{ATS \times CF}{\eta_{TT}}\left(P_r^{\frac{\gamma-1}{\gamma}} - 1 + \eta_{TT}\right)$$

where: ATS is the temperature of the turbocharger compressor inlet;
   $\eta_{TT}$ is the compressor efficiency;
   $P_r$ is the compressor pressure ratio;
   $\gamma$ is the ratio of specific heats; and
   CF is the TCO sensor correction factor.

8. A computer-readable storage medium having stored data representing instructions executable by a computer to control an internal combustion, compression-ignition engine, having an EGR circuit, a charge air cooler, and a turbocharger compressor, to avoid overheating the charge air cooler, the computer-readable storage medium comprising:
   instructions for determining a crucial temperature above which damage to the charge air cooler could occur;
   instructions for determining current ambient conditions;
   instructions for determining current engine operating conditions;
   instructions for processing an equation wherein a value of turbocharger compressor output temperature is predicted as a function of parameters representing the determined current ambient conditions and current engine operating conditions;
   instructions for comparing the predicted turbocharger compressor output temperature with the determined crucial temperature; and
   instructions for controlling the engine to prevent damage to the charge air cooler if the turbocharger compressor output temperature exceeds the determined crucial temperature.

9. The computer-readable storage medium as defined by claim 8, wherein the instructions for determining a crucial temperature include instructions for assigning a value from a memory or storage of data.

10. The computer-readable storage medium as defined by claim 8, wherein the instructions for determining current ambient conditions include instructions for determining ambient air temperature and air pressure.

11. The computer-readable storage medium as defined by claim 8, wherein the instructions for determining current engine operating conditions include instructions for determining air mass flow rate and turbocharger compressor speed.

12. The computer-readable storage medium as defined by claim 8, wherein the instructions for controlling the engine comprise instructions for reducing the temperature of the charge air cooler.

13. The computer-readable storage medium as defined by claim 12, wherein the instructions for reducing the temperature of the charge cooler comprise instructions for bypassing at least a portion of the charge air around the charge air cooler before said portion of the charge air around the charge air cooler is directed to an intake manifold of the engine.

14. The computer-readable storage medium as defined by claim 8, wherein the instructions for processing an equation comprise instructions for processing the following equation:

$$TCO = \frac{ATS \times CF}{\eta_{TT}}\left(P_r^{\frac{\gamma-1}{\gamma}} - 1 + \eta_{TT}\right)$$

where: ATS is the temperature of the turbocharger compressor inlet;
   $\eta_{TT}$ is the compressor efficiency;
   $P_r$ is the compressor pressure ratio;
   $\gamma$ is the ratio of specific heats; and
   CF is the TCO sensor correction factor.

15. A system for controlling an internal combustion, compression-ignition engine, having an EGR circuit, a turbocharger compressor, and a charge air cooler, to avoid overheating the charge air cooler, the system comprising:
   a computer-readable storage medium storing a value of a crucial temperature above which damage to the charge air cooler could occur;
   ambient condition sensors for determining current ambient conditions;
   engine condition sensors for determining current engine operating conditions;
   a charge air bypass valve for selectively bypassing at least a portion of charge air around the charge air cooler before it is combined with recirculated exhaust gas; and
   a processor for calculating an equation wherein a value of turbocharger compressor output temperature is predicted as a function of parameters representing the determined current ambient air temperature, current air pressure, rotational speed of the turbocharger compressor, and air mass flow rate, the processor comparing the predicted turbocharger compressor output temperature with the determined crucial temperature, the charge air bypass valve being responsive to a processor command to bypass at least a portion of charge air around the charge air cooler if the predicted turbocharger compressor output temperature exceeds the determined crucial temperature.

16. The system as defined by claim 15, wherein the ambient condition sensors comprise:
a temperature sensor for determining current ambient air temperature; and
a pressure sensor for determining current air pressure.

17. The system as defined by claim 15, wherein the engine condition sensors comprise:
a turbo speed sensor for determining the rotational speed of the turbocharger compressor; and
an air mass flow rate sensor for determining air mass flow rate through the turbocharger compressor.

18. The system as defined by claim 15, wherein the equation calculated by the processor comprises the following:

$$TCO = \frac{ATS \times CF}{\eta_{TT}}\left(P_r^{\frac{\gamma-1}{\gamma}} - 1 + \eta_{TT}\right)$$

where: ATS is the temperature of the turbocharger compressor inlet;
$\eta_{TT}$ is the compressor efficiency;
$P_r$ is the compressor pressure ratio;
$\gamma$ is the ratio of specific heats; and
CF is the TCO sensor correction factor.

* * * * *